United States Patent [19]

Mercurio et al.

[11] Patent Number: 5,062,194
[45] Date of Patent: Nov. 5, 1991

[54] METHOD FOR INSTALLING O-RING SEALS

[75] Inventors: Joseph F. Mercurio, Birmingham; Salvador Cantio, Troy, both of Mich.

[73] Assignee: General Motors Corporation, Detroit, Mich.

[21] Appl. No.: 612,155

[22] Filed: Nov. 13, 1990

[51] Int. Cl.⁵ .............................................. B23P 19/02
[52] U.S. Cl. ...................................... 29/451; 29/235; 29/450
[58] Field of Search ................. 29/450, 451, 453, 717, 29/229, 235; 425/DIG. 42; 264/291, 326; 221/200, 236, 270, 268

[56] References Cited

U.S. PATENT DOCUMENTS

| | | | |
|---|---|---|---|
| 3,605,239 | 9/1971 | Escholz | 29/717 |
| 3,851,369 | 12/1974 | Escholz | 29/717 |
| 4,177,546 | 12/1979 | Geisinger | 29/235 |
| 4,236,305 | 12/1980 | Hetherington et al. | 29/450 X |
| 4,325,172 | 4/1982 | Holdaway | 29/450 X |

FOREIGN PATENT DOCUMENTS 54-146  4/1980  Japan ................................ 29/450

OTHER PUBLICATIONS

Brochure page of "The O-Ring Installation Machine", by Kallsen Associates.

*Primary Examiner*—Joseph M. Gorski
*Assistant Examiner*—S. Thomas Hughes
*Attorney, Agent, or Firm*—Patrick M. Griffin

[57] ABSTRACT

O-rings are machine installed in retention grooves cut into a cylindrical part through the use of a size matched cylindrical mandrel that moves in piston fashion within a guide cylinder. A feed ramp and loading slide stretch each O-ring over the end of the mandrel, which is then abutted with and pushed down by the part into the cylinder. The O-ring is thereby rolled off of the mandrel by the edge of the cylinder and onto the part until it snaps into the retention groove.

1 Claim, 4 Drawing Sheets

METHOD FOR INSTALLING O-RING SEALS

This invention relates to a method for installing O-ring seals in general, and specifically to a method particularly adapted to automatic operation. Background of the Invention In the automotive industry, O-ring type seals are installed into circular grooves cut into the cylindrical outer surfaces of parts, such as the housings of constant velocity joints. These may be of fairly large diameter, and are generally installed manually. A practical method for automatic, machine aided assembly would represent a potential time and cost savings.

SUMMARY OF THE INVENTION

The invention provides such a machine aided assembly method. In the embodiment disclosed, a cylindrical part, such as a CV joint housing, has an outer surface with a predetermined diameter and a circular O-ring retention groove cut into the outer surface, near the end of the part. The O-ring, which is elastic and resilient, has a free state diameter which is less than the diameter of the part outer surface, and also slightly less than, though closer to, the retention groove diameter.

Working within these predetermined parameters, the O-ring is installed into the retention groove with a special apparatus. A cylindrical mandrel is provided that has a circular end face with a diameter substantially equal to the part outer surface. A guide cylinder for the mandrel is also provided which has an annular end edge. The mandrel fits closely within the guide cylinder for axial, up and down sliding, like a piston. The mandrel moves between a loading position where its end face is above the cylinder end edge, and a release position where it is below. The mandrel is spring loaded to return to the loading position, in the disclosed embodiment. A feed ramp slopes down to and end located just above and to the side of the mandrel end face, in its loading position. A loading slide stored horizontally beneath the feed ramp is adapted to extend out past the end of the feed ramp and closely over the mandrel end face, after which it is retracted.

In operation, O-rings are fed down the feed ramp one at a time while the mandrel is in the loading position. As it falls off of the end of the feed ramp, each O-ring hits a ledge and is stopped temporarily in a loading orientation. In the loading orientation, the O-ring leans against the end of the feed ramp and away from the mandrel end face, but is capable of being tipped over onto the mandrel end face. After the O-ring reaches the loading orientation, the loading slide is extended. Initially, the slide tips the O-ring over onto the mandrel end face. As the loading slide continues to extend, the O-ring is carried with it and stretched out and over the mandrel end face. After the loading slide has retracted, the end of the part is abutted with the end face of the mandrel, concentric thereto. Next, the part is pushed down, which pushes the mandrel down with it toward the release position. As the mandrel end face sinks below the edge of the guide cylinder, the outer surface of the part moves into the guide cylinder. Simultaneously, the O-ring is rolled off of the mandrel by the guide cylinder end edge and the outer surface of the part. Finally, the O-ring rolls into the retention groove, where it contracts into place. The part is removed, the mandrel returns to loading position, and the cycle starts anew. The process may be conveniently automated. Even if the part is handled manually, the process is speeded up by the installation apparatus, since the O-ring need not be manually handled or guided.

It is, therefore, an object of the invention to provide a machine aided, easily automated process for installing elastic O-rings in retention grooves cut into the cylindrical outer surface of a part.

It is another object of the invention to provide such a process that uses a size matched mandrel to stretch and hold the O-ring so that the part can be aligned with the mandrel and the two pushed down simultaneously into a guide cylinder to automatically push the O-ring off of the mandrel and into the retention groove.

It is another object of the invention to further speed the process by feeding the O-rings to and onto the mandrel automatically, one by one.

It is still another object of the invention to apply the O-rings automatically to the mandrel one by one with a cooperating feed ramp and loading slide that stretches the O-rings out over the end of the mandrel.

DESCRIPTION OF THE PREFERRED EMBODIMENT

These and other objects and features of the invention will appear from the following written description, and from the drawings, in which.

Figure 1:
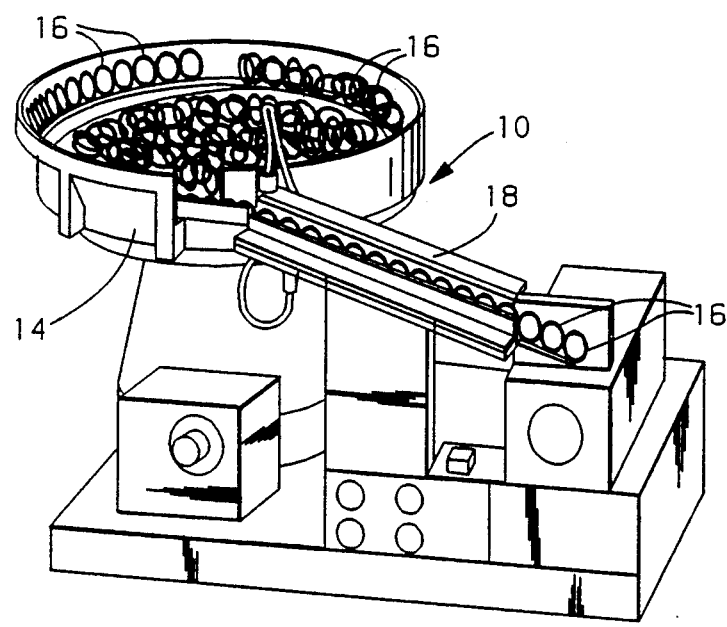
FIG. 1 is a view of a conventional vibratory bowl feeder from which O-rings may be fed one at a time.
Figure 2:
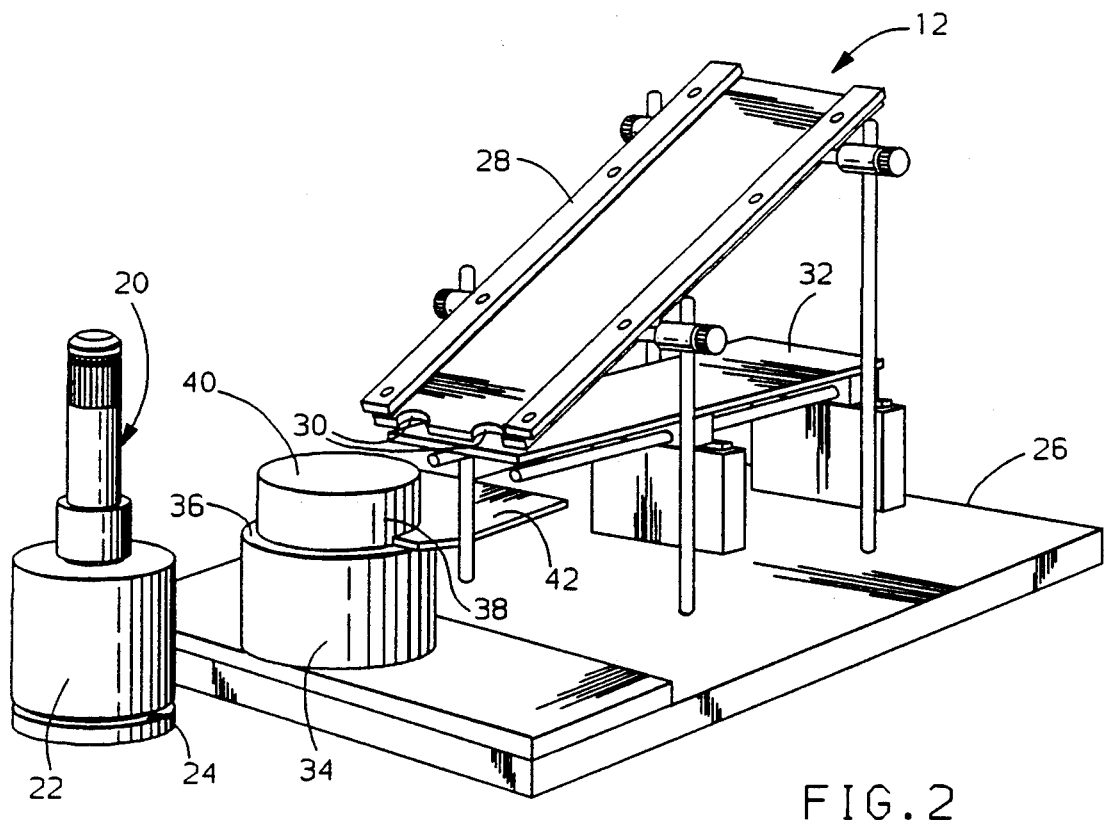
FIG. 2 is a view of the installation apparatus used to practice the method of the invention, shown next to a constant velocity joint housing.

Referring first to FIGS. 1 and 2, the apparatus used to practice the method of the invention includes two basic systems, a vibratory bowl feeder, indicated generally at 10, and a seal installation apparatus, indicated generally at 12. Bowl feeder 10 a standard part feeder, and includes a large vibrating drum 14 into which a supply of conventional O-rings 16 may be dumped. O-rings 16 are standard seals, circular in shape and circular in cross section, molded from a resilient elastic material with a known free state diameter. The O-rings 16 are vibrated out of drum 14 and feed down a trough 18 one at a time, whereupon installation apparatus 12, described below, takes over. Each O-ring 16 ultimately is applied to a part, which, in this case, is a constant velocity joint housing, indicated generally at 20. Housing 20 has a cylindrical outer surface 22 into which is cut a circular retention groove 24, spaced axially from the end of housing 20. The predetermined diameter of the surface 22 is a given, and the diameter of groove 24 is somewhat less than that. The known free state diameter of O-ring 16 is chosen to be just slightly less than the diameter of groove 24, and smaller yet relative to the part outer surface 22. O-ring 16 will, therefore, fit snugly into groove 24, under some residual tension.

Referring next to FIG. 2, installation apparatus 12 is built on a frame 26, which supports a feed ramp 28 that slopes down at about a forty five degree angle. Feed ramp 28 is substantially as wide as the free state diameter of an O-ring 16, and its lower end is formed with two scallops 30 spaced apart by the diameter of an O-ring 16, for a purpose described below. Frame 26 also supports a horizontal loading slide 32 just below the lower end of feed ramp 28. Slide 32 can be extended and retracted by any suitable means, not separately shown. A guide cylinder 34 is fixed to the front of frame 26, just in front of the lower end of ramp 28, as well as below and perpendicular to slide 32. Guide cylinder 34 has an inner diameter equal to the diameter of housing outer surface 22, and an upper annular end edge 36. A cylindrical mandrel 38 is sized to fit closely within guide cylinder 34, so as to move up and down like a piston. Mandrel 38 is spring loaded or otherwise biased upwardly so that its circular end face 40 normally sits in what may be termed a loading position. In the loading position, end face 40 sits above guide cylinder end edge 36, at a height where loading slide 32 will just skim over it when extended. Finally, a ledge 42 sits on guide cylinder end edge 36, below the end of feed ramp 28. Ledge 42 serves, in effect, as an extension of edge 36 between mandrel 38 and the end of feed ramp 28.

Figure 3:
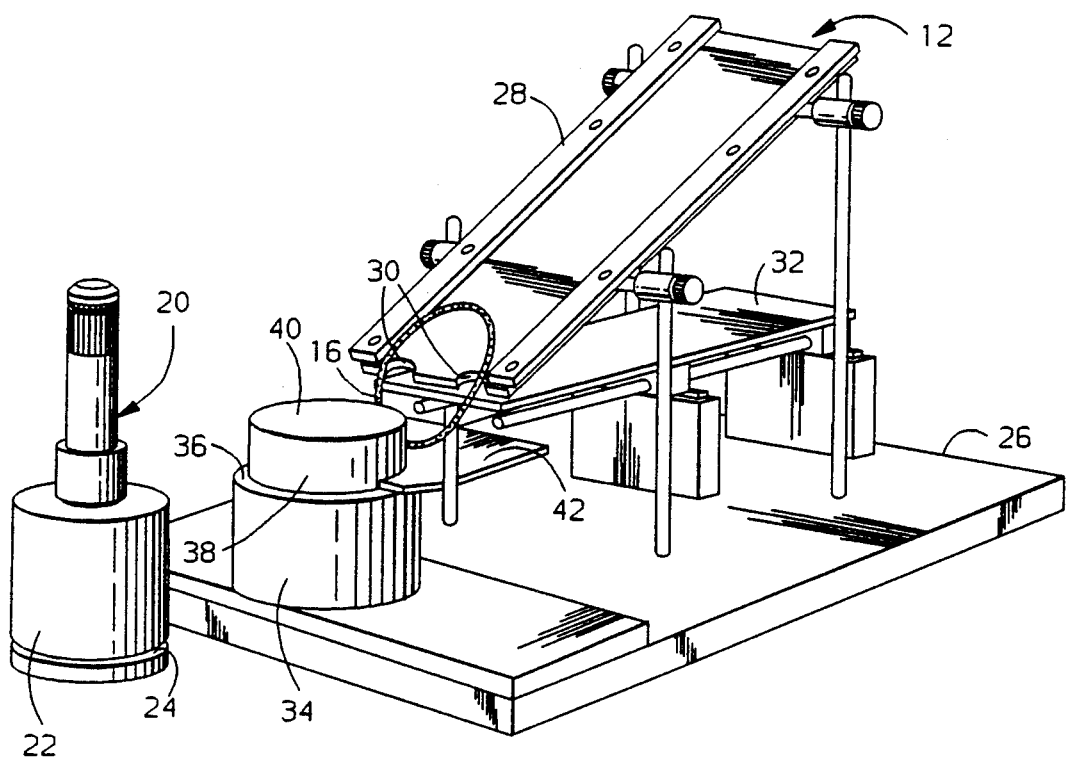
FIG. 3 shows an O-ring having reached the loading orientation.
Figure 4:
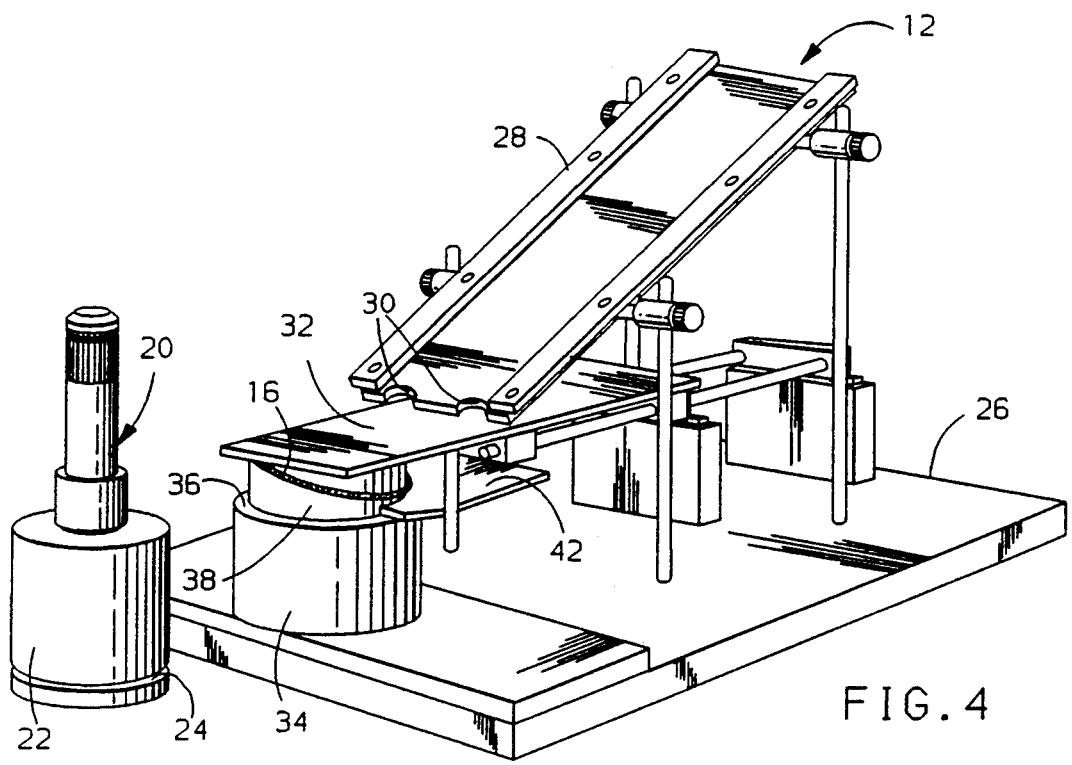
FIG. 4 shows the loading slide extended.
Figure 5:
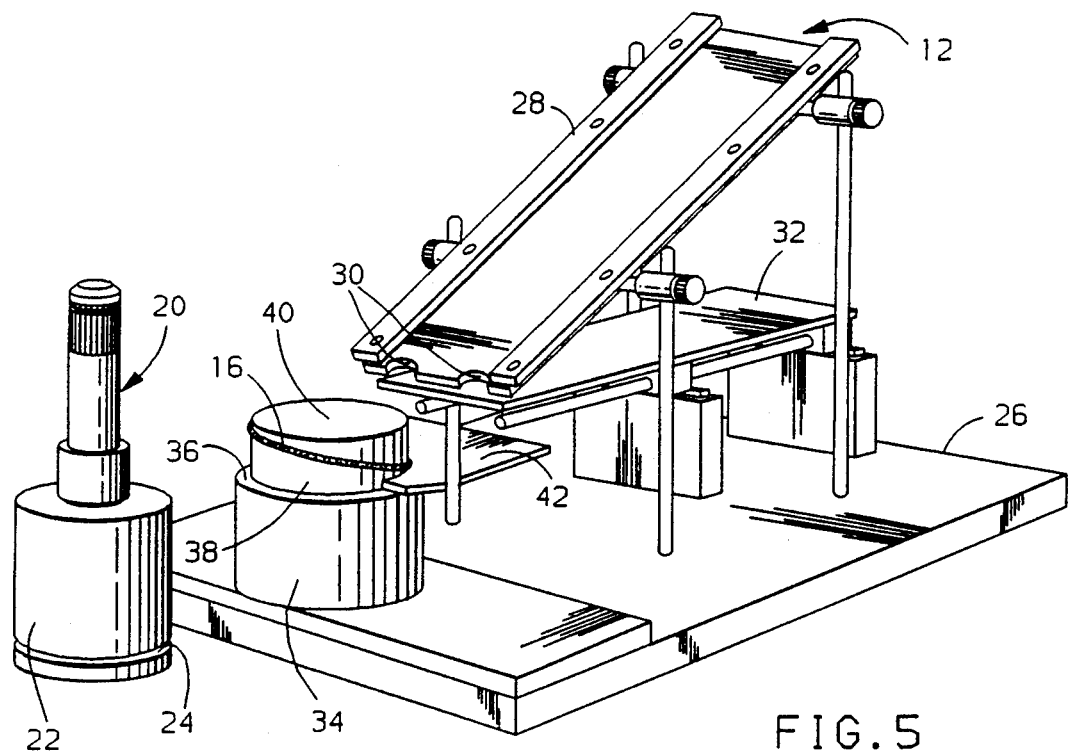
FIG. 5 shows, the loading slide retracted, with the O-ring stretched over the mandrel.

Referring next to FIGS. 3 through 5, the initial steps in the installation method are illustrated. An O-ring 16 tips down off of trough 18 onto feed ramp 28, one at a time. Each O-ring 16 slides partially off the end of feed ramp 28, hitting ledge 42 near mandrel 38, between end face 40 and the end of feed ramp 28. The scallops 30 help to support O-ring 16 almost upright in a temporary loading orientation, as shown in FIG. 3. In the loading orientation, O-ring 16 is adjacent, but tipped away from, the mandrel end face 40, leaning against the end of feed ramp 28. Stated more generally, in the loading orientation, the plane of the O-ring 16 is tilted relative to the plane of the mandrel end face 40, which intersects the plane of the O-ring 16, essentially bisecting it in the example disclosed. Next, loading slide 32 is extended, as shown in FIG. 4. Though not separately illustrated, the initial action of the slide 32 would be to tip O-ring 16 in the other direction and down over a third to a half of the edge of mandrel end face 40. As it continues to extend out, loading slide 32 moves closely over mandrel end face 40 in the manner of a knife scraping excess crust off the top edge of a pie plate. Because of the orientation it was in, O-ring 16 is already trapped over part of the edge of mandrel end face 40, and is inevitably stretched out and down over the rest of end face 40, as shown in FIG. 4. Next, loading slide 32 is retracted, as shown in FIG. 5, leaving O-ring 16 loaded onto mandrel 38, in tension, but not necessarily perpendicular to the axis thereof.

Figure 6:
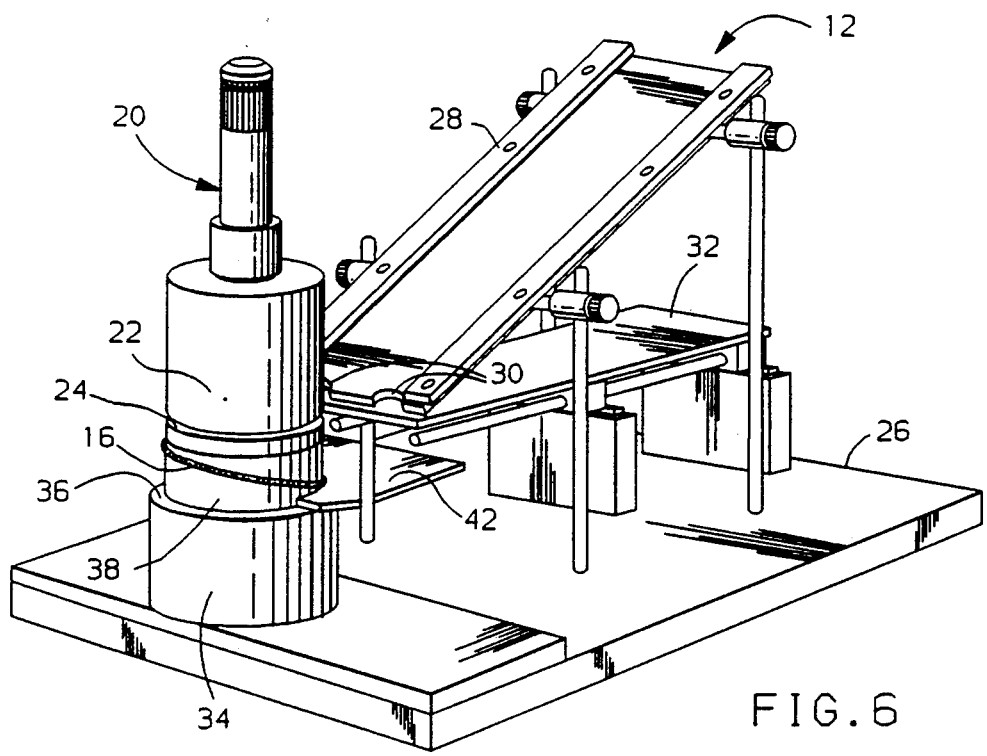
FIG. 6 shows the housing part abutted and aligned with the loaded mandrel.
Figure 7:
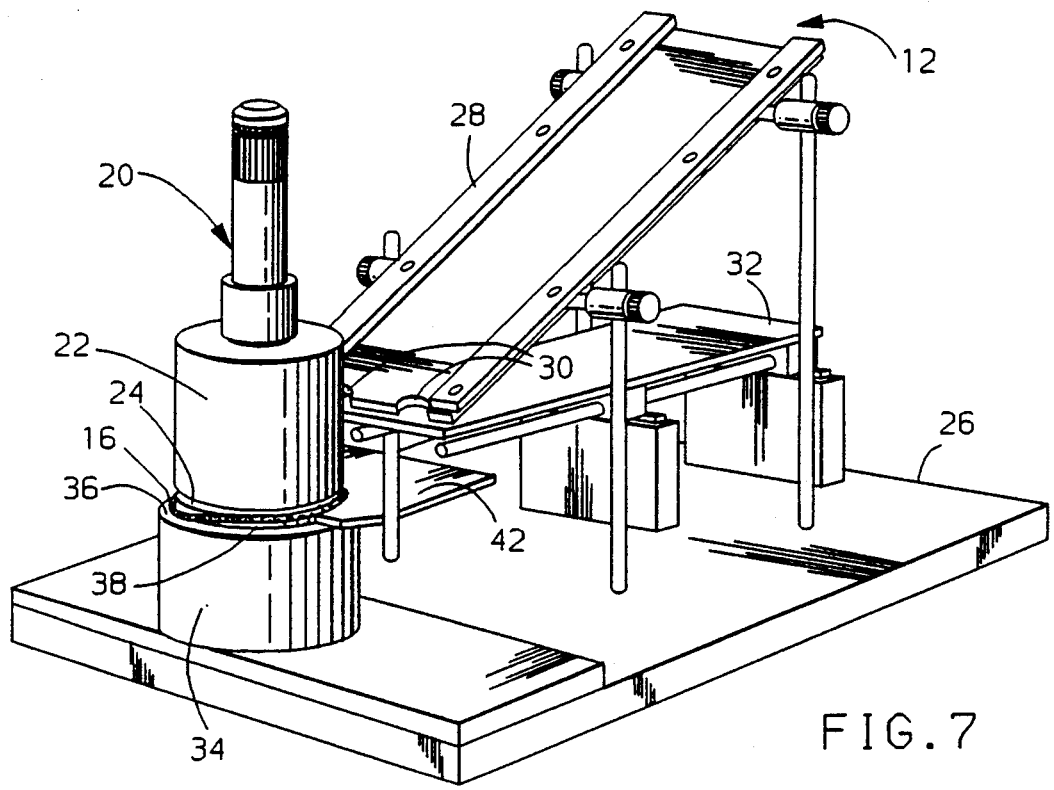
FIG. 7 shows the mandrel and part pushed down to its release position, with the O-ring moved off of the mandrel and onto the part, just short of the retention groove.
Figure 8:
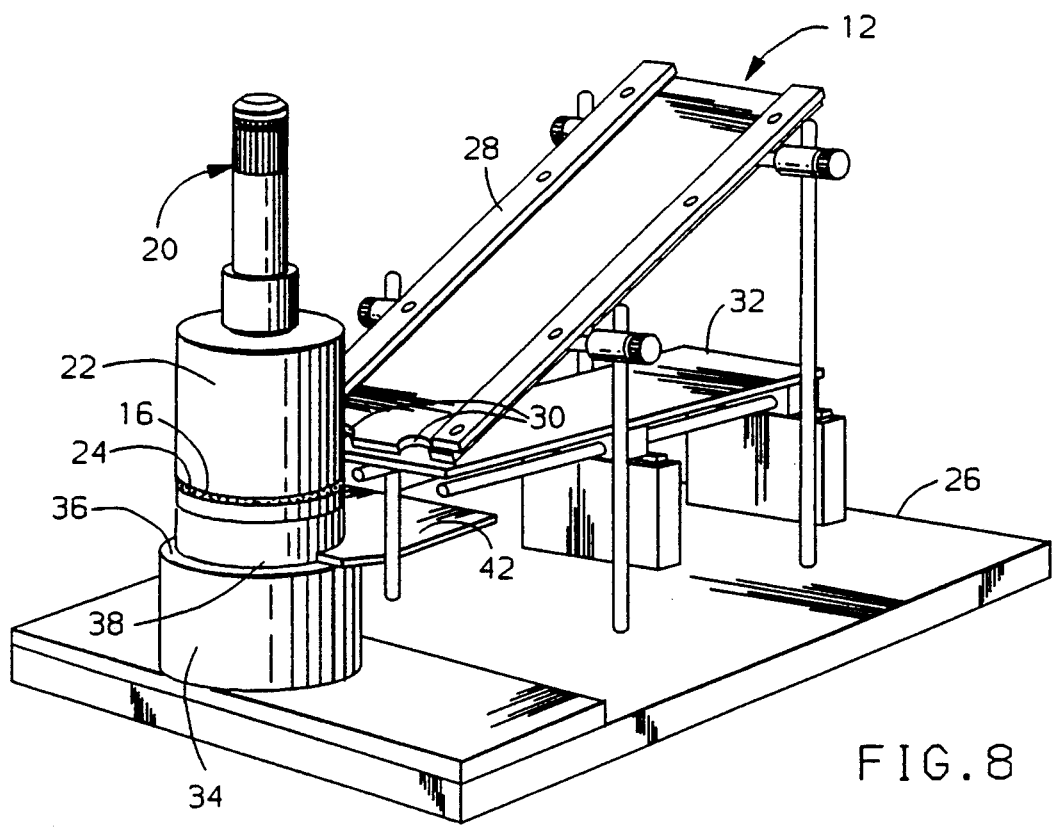
FIG. 8 shows the O-ring in the retention groove, with the mandrel moved back up to the loading position.

Referring next to FIGS. 6 through 8, once O-ring 16 is loaded onto mandrel 38, the end of housing 20 is abutted with mandrel end face 40, concentric thereto. Then, housing 20 and mandrel 38 are pushed down together. As mandrel 38 slides down inside guide cylinder 34, O-ring 16 hits the end edge 36, and will eventually be squared up perpendicular to the coaxis axis of housing 20 and mandrel 38. O-ring 16 will roll along the outer surface of mandrel 38 until the mandrel end face 40 moves below guide cylinder end edge 36. At that point, not separately illustrated, the housing 20 will move into guide cylinder 34, and O-ring 16 will roll off of mandrel 38 and onto part outer surface 22 As housing 20 continues to move down, guide cylinder end edge 36 will roll O-ring 16 along the outer surface 22 until O-ring 16 is just short of the retention groove 24, as shown in FIG. 7. Housing 20 need only be pushed down far enough to roll O-ring 16 into retention groove 24, although it would not matter if it moved farther. Stated differently, mandrel 38 is moved down until its end face 40 reaches a release position at least as far below guide cylinder end edge 36 as retention groove 24 is above the end of housing 20. A stop inside of guide cylinder 34 could be devised to block mandrel 38 from moving farther at that point. Finally, housing 20 is pulled back up, and mandrel 38 returns to the loading position empty, ready to be reloaded.

Variations in the disclosed method and apparatus could be made. In general, every manipulation of the apparatus 12 and housing 20 could be done manually, which would still avoid handling the O-ring 16 manually. Or, those same manipulations could be easily automated. For example, some other means for stretching an O-ring 16 down over the mandrel end face 40 could be devised, but the loading slide 32 is particularly advantageous, because its extension and retraction can be easily done, even manually. Or, some automatic means, such as a pneumatic cylinder, could be provided to extend and retract the loading slide 32, activated by a sensor to detect when an O-ring 16 had reached the loading orientation. A suitable part feeder could be devised to automatically align housing 20 with mandrel 38 and push it down and lift it back. Or, the housing 20 could be easily plunged down and lifted up manually, taking the spring biased mandrel 38 with it, since the release position of mandrel 38 is not critical per se. All that is necessary is that mandrel 38 be pushed down far enough to carry retention groove 24 below guide cylinder end edge 36, which can be easily visually verified. Spring loading mandrel 38 to move back to its loading position, as described, is well suited to using housing 20 to move mandrel 38, whether housing 20 is handled automatically, or by hand. Theoretically, however, if a part like housing 20 were heavy enough, mandrel 38 could be powered up and down between the loading and release positions by a suitable automated means, carrying housing 20 up and down with it. There would then be no need to apply any force to housing 20, once it had been set in place on mandrel 38. Therefore, it will be understood that it is not intended to limit the invention to just the embodiment disclosed.

The embodiments of the invention in which an exclusive property or privilege is claimed are defined as follows:

1. A method of installing an elastic O-ring seal in a retention groove cut into a cylindrical outer surface of a part, said part outer surface having a predetermined diameter, said O-ring seal having a free state diameter less than said predetermined diameter comprising the steps of, providing a cylindrical mandrel having a circular end face with a diameter substantially equal to said predetermined part outer surface diameter, mounting said mandrel for close fitting axial sliding within a guide cylinder having an annular end edge such that said mandrel is axially movable from a loading position with its end face above said guide cylinder end edge to a release position below said end edge, providing a feed ramp to feed said O-rings one at a time into a loading orientation adjacent to said mandrel end face and in which the plane of said O-ring is tilted away from and intersected by the plane of said mandrel end face, providing a loading slide beneath the end of said feed ramp adapted to extend out past the end of said feed ramp and closely over said mandrel end face, feeding an O-ring into said loading orientation when said mandrel is in said loading position, extending said loading slide, thereby stretching said O-ring over said mandrel and below said end face, abutting said part with said mandrel end face in its loading position with said part outer surface and mandrel end face concentric, and, moving said mandrel to its release position while maintaining said part abutted with said end face, thereby pushing said stretched O-ring off of said mandrel with said guide cylinder end edge and onto said part outer surface until said O-ring contracts into said retention groove.

* * * * *